United States Patent
Fabbri

[11] 3,757,617
[45] Sept. 11, 1973

[54] FOAM CUTTING APPARATUS

[76] Inventor: John A. Fabbri, 19067 Celtic St., Northridge, Calif. 91335

[22] Filed: Mar. 16, 1972

[21] Appl. No.: 235,332

[52] U.S. Cl.............. 83/1, 83/171, 83/411 R, 83/733, 83/565, 83/651.1
[51] Int. Cl............................................. B26d 3/10
[58] Field of Search............... 83/1, 51, 409, 411 R, 83/428, 433, 170, 171, 733, 565, 578, 651.1, 698, 4

[56] References Cited
UNITED STATES PATENTS

| | | | |
|---|---|---|---|
| 3,714,855 | 2/1973 | Noordenbos | 83/1 |
| 3,540,336 | 11/1970 | Kelsey | 83/171 |
| 3,468,353 | 9/1969 | Okey | 83/565 X |
| 3,350,968 | 11/1967 | Melander | 83/1 |
| 2,451,027 | 10/1948 | Gano et al. | 83/565 |

Primary Examiner—Andrew R. Juhasz
Assistant Examiner—W. D. Bray
Attorney—Robert G. Upton

[57] ABSTRACT

An apparatus and a method for cutting rigidized foam material which comprises one or more electrically heated, stretched wires between at least a pair of fixed points, the foam material being directed into the heated wires at a uniform rate by a foam block retaining mechanism, the wires being directed by at least a pair of templates adjacent the mechanism at opposite ends of the foam material, thus guiding the wires through the foam, thereby cutting it to the shape of the templates.

11 Claims, 6 Drawing Figures

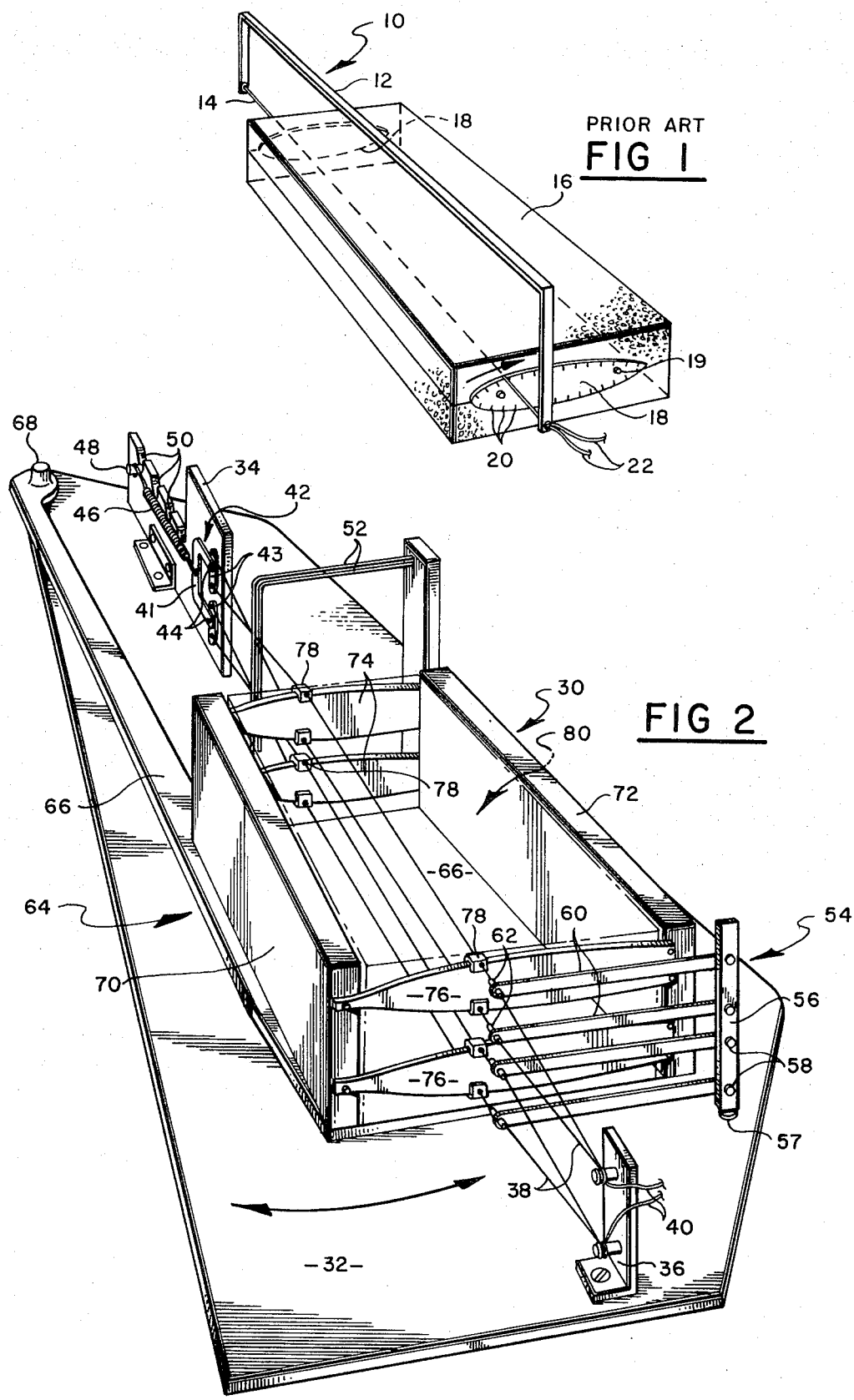

FOAM CUTTING APPARATUS

BACKGROUND OF THE INVENTION

1. Field of the Invention

Foam wing panels are becoming increasingly popular with model aircraft builders. The foam wing material takes the place of conventional wing structure techniques which involve assembly of a multiplicity of wing ribs, spars, etc. The foam wing panels are usually covered with thin sheets of, for example, balsa wood, plywood, or the like. The covering material is subsequently cemented to the basic foam wing material after the wing panels have been cut to the desired airfoil shape. The foam wing panels are then joined together at their center sections, thus forming the entire wing assembly.

2. Description of the Prior Art

A current method to cut rigidized foam material to form, for example, wing panels for model aircraft, include the following prior art techniques. Normally foam blocks are rough cut to a general plan form shape, followed by attaching wing airfoil templates to adjacent ends of the rough cut block of foam material. The templates are normally pinned to the foam block at both ends and the templates are generally fabricated from a heat resistant material such as metal, or the like. The templates are subsequently marked off at even increments about the peripheral edge of the airfoil section. The equidistantly spaced increments are then sequentially numbered for the following reason. After the ribs are pinned to the end faces of the foam block a length of electrically heated wire is stretched between a bow, the wire and bow being of greater length than the foam block. The wire is then heated to a temperature sufficient to melt the foam material. Two people at opposite ends of the bow position themselves over the foam block to be cut. The wire is then passed into the foam block, controlled by operators at either end of the bow. As the wire moves over the templates, verbal coordination between the operators takes place during the foam slicing cycle, thus maintaining the wire at the same position chord-wise at opposite ends of the foam block. The operator at one end indicates verbally that he is at, for example, position "1" so that the operator at the opposite end is able to adjust his end to the corresponding position "1" at his end of the foam block. Thus, as the wire traverses over the templates at opposite ends of the block, it is controlled at the same rate of speed so that the wire approaches the same numbered increments as it passes over the pair of rib templates. One pass is made over the top surface of the airfoil, followed by a second pass over the bottom surface, following the same verbal coordination technique to control the movement of the wire over the ribs.

The prior art methods just described suffer from the obvious human factor in that it is difficult to coordinate the position of the hot wire over the airfoil templates so that the wire is moved at the same rate at both ends of the foam block, thus it can be seen that one operator may lag the other operator, causing an uneven surface to be imparted to the finished foam wing panel. When rib patterns of different cord lengths are utilized, one operator must move much faster than the other operator because of the greater distance the wire must travel at one end than at the other end. Thus it can be seen that it is even more difficult to coordinate the travel of the wire over the templates at a uniform rate.

SUMMARY OF THE INVENTION

It is an object of this invention to provide an apparatus and a method to cut, for example, foam wing panels from foam blocks, at a uniform rate.

More specifically, it is an object of this invention to cut one or more foam wing panels from a foam block at a uniform rate in one pass by one operator in a mechanized manner.

The foam-cutting apparatus basically includes a base portion that has thereon a pair of fixed wire anchor posts designed to accept one or more resistably heatable wires suspended between the wire anchors. A foam-retaining carriage box is slideably and pivotably mounted to the base portion, the carriage being disposed between the wire anchor posts so that the wires pass within the interior of the foam-retaining carriage. At adjacent ends of the carriage are located at least a pair of templates so that, in one embodiment, the wires pass over the templates at adjacent ends of the carriage. The carriage then is pivotably moved through an arc, the arc being established by the length of the radial base arm pivoted to the base plate and mounted to the foam-retaining carriage. The fixed, heatable wires under tension pass through the carriage connected to the radial base arm and over the templates at adjacent ends of the carriage as the carriage is moved past the wires from one radially disposed edge of the foam-retaining carriage to the other side or radially disposed edge. A block of foam is then fitted within the carriage while the carriage is positioned so that the wires are to one side, out of the way. The wires are then subjected to a source of electrical power, thereby heating the wires to a temperature sufficient to cut the foam material. The foam is cut by resistance heating, for example, nichrome wire. Heating of the wire is normally controlled by a variable voltage ac power supply. The foam-retaining carriage is then pivoted or moved into the wires at a uniform rate so that the wires traverse over the templates at adjacent ends of the carriage, through the foam, thus cutting the foam to the shape of the templates as the pivotable, foam-retaining carriage is moved through the heated wires under tension. The carriage may be moved by a servo motor or the like, or it may be manually urged through the wires. As the foam-retaining mechanism traverses through an arc from one radially disposed side wall to the other, the heated wires pass out of the foam so that the cut foam block may then be removed from the carriage. The resultant wing panel core or cores are then removed from the foam block. Accordingly, a basic advantage over the prior art is the elimination of the second operator in cutting foam wing panels for model aircraft and the like.

Another advantage over the prior art is that both of the top and bottom surfaces of the wing panels are cut in one pass.

Still another advantage is that the cuts through the foam block are uniform.

Yet another advantage over the prior art is that all the wires remain fixed to the base portion, thus minimizing uneven or non-uniform movement of the wires guided by the templates associated with the foam-retaining carriage as the carriage moves past the fixed wires.

Still another advantage is that both wing panels may be cut from a single block of foam material in a single pass.

Another advantage over the prior art is that the wires never leave the templates in one embodiment, thus obviating the possibility of an uneven surface on the foam wing panels and eliminating the human inconsistency factor.

Still another advantage over the prior art is the increased production rate in that the foam wings may be cut at a rate approximately four times faster than the prior art method described heretofore.

Another advantage is the repeatability fo the foam cutting process in that each and every wing panel comes out of the foam cutting mechanism identical to the previously cut panel.

The above noted objects and advantages of the present invention will be more fully understood upon a study of the following detailed description in conjunction with the detailed drawings.

BRIEF DESCRIPTION OF THE DRAWINGS

FIG. 1 is a perspective view of the prior art device described in the specification;

FIG. 2 is a perspective view of one embodiment of the present invention illustrating all of the various components associated with the foam cutting apparatus;

DESCRIPTION OF THE INVENTION

Figure 3:
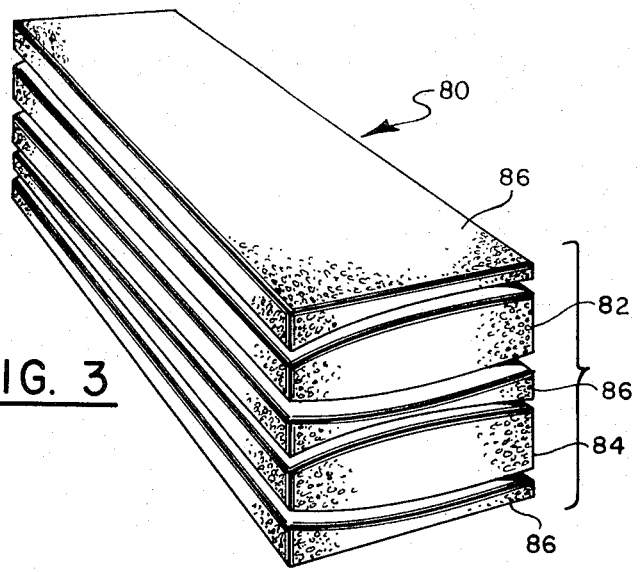
FIG. 3 is an exploded view of a block of foam after it has passed through the foam cutting apparatus, illustrating how the wing patterns would appear after the block is removed from the apparatus.

Turning now to the prior art of FIG. 1, the foam cutting device generally designated as 10 is comprised of a bow 12 having suspended between the limbs of the bow a heatable wire 14 under tension. A pair of wing rib templates 18 are pinned at both ends to a precut section of foam 16 by pins 19. The wing templates 18 have a series of equidistantly spaced increments 20 around the peripheral edge of the template, as previously described. The wire is subjected to a source of electricity which resistably heats the wire to a temperature sufficient to melt the foam. Two people position themselves adjacent the ends of the bow, after the wire has been preheated, and guide the wire towards the template 18 so that it contacts the trailing edge of the templates. One of the individuals manipulating the bow calls out the increments on his rib template and the other individual follows suit by hitting those incremental marks on his template as they are called out. The wire is moved over the entire peripheral edge of the templates. The cut cores are then removed from the foam block 16.

Referring to FIG. 2, one embodiment of the instant invention consists of a foam cutter assembly generally designated as 30. The foam cutter 30 has a base portion 32 which supports a whiffle-tree tower 34 at one end and a terminal block 36 at the other end. The whiffle-tree tower 34 and the terminal block 36 are firmly anchored at base 32 of the foam cutter. In this particular example, at least four wires are stretched between the whiffle-tree mechanism 42, attached to tower 34, and the wire terminal block 36. The whiffle-tree device 42 is comprised of a generally U-shaped body 41 having a pair of wire-retaining bars 43 pivoted at pivot 44 from the end of each leg of the whiffle-tree body 41. A spring member 46 is centrally anchored to the whiffle-tree body 41 and terminates in a spring-retaining pin 48, the pin 48 being engaged with a series of spring tension adjusting clevises 50. The whiffle-tree 42 is adapted to ensure equal tension to the wires 38 being stretched between the whiffle-tree and the terminal anchor block 36. The wires 38 stretched between the whiffle-tree device 42 and the fixed tower on terminal block 36 may be, for example, nichrome, stainless steel, or Inconel wire. Nichrome wire is preferred due to its high resistance properties. The wires 38 must be under a constant tension load when they are electrically heated due to thermal expansion. A taut wire assures a straight cut (no bow due to gravitational forces and material drag) as the wire moves through the foam block 80. The nichrome or equivalent wire sizes may be from 0.0073 to 0.020, dependent upon the application. For example, the heavier the wire, the faster the cut. However, the cut is likely to be less consistent due to higher heat emission of the heavier wire. Heating of the wire, as previously stated, is controlled by a variable voltage ac power supply having a typical input of 115 volt ac, 60 cycles. It is important to maintain equal tension to each of the nichrome wires 38 for uniform cutting of the block of foam material. The nichrome wires 38 are guided through a pair of wire stabilizing guide rails 52 which are anchored to base 32. The wire stabilizing guide rails are positioned adjacent a pair of rib tip pattern templates 74. Yet another self-centering, wire stabilizing guide device 54 is positioned adjacent a second set of rib templates 76, the self-centering stabilizing guide being anchored through pivot 57 to base 32. The wire stabilizing guide adjacent template 76 is comprised of wire stabilizing arms 60 which are pivotably connected to a rotatable post 56 through pivots 58. At the extreme end of the stabilizing arms 60 is positioned nichrome wire guide tubes 62, the wires 38 being fed therethrough and subsequently connected to the terminal block 36.

A movable carriage generally designated as 64 is comprised of a carriage base 66 which is pivotably connected to base 32 through pivot pin 68. It should be pointed out here that the carriage need not be pivoted at one end, it could simply be pushed directly across the base 66 through the stretched wires 38. The carriage base 66 has connected thereto a radially extending foam-retaining wall 70 on one side, and a similar foam-retaining wall 72 on the opposite side. Across the ends of the foam-retaining walls 70 and 72 are connected a pair of tip rib templates 74 adjacent the wire guides 52, and at the opposite end a pair of root tip templates 76 are connected across the ends of walls 70 and 72 adjacent the self-centering wire guide device 54.

To insert the precut foam block 80, the carriage base 64 is pivoted to one side so that the wires 38 are adjacent, for example, wall 72. The precut foam block 80 is then slipped in the space defined by the ribs 74, 76 and the walls 70, 72. The nichrome wires 38 are heated through wiring 40 by a source of electricity (not shown). The carriage 64 is then traversed through an arc at a uniform rate, in this case to the right, into the hot nichrome wires 38, guiding the wires through the foam. The wires, of course, follow the pattern of the tip template 74 and root template 76. A plurality of slotted wire guide shoes 78 assure that the wires smoothly slide over the rib templates 74, 76. The carriage assembly 64, after it has moved through an arc, comes to rest when the wires 38 contact the wall 70. It can be seen then that the wire stabilizing guides 52 and the self-centering, wire stabilizing assembly 54, being positioned close to the pair or ribs 74, 76, easily guide the wire over the rib templates. Because the wire guides are positioned so close to the pair or ribs, the wires 38 connected to each of the wire guide shoes 78 have no chance to chatter or otherwise cause an uneven movement of the wires over the rib templates.

Once the carriage 64 is traversed through the arc, directing the wires through the foam, the foam block can then be lifted out of the space defined by the rib templates 74, 76, and the foam-retaining walls 70, 72. FIG. 3 shows the resultant foam block after it has been cut by the hot nichrome wire. The wing panels 82 and 84 are then shaped exactly to the pattern defined by the rib templates 74 and 76. The scrap foam 86 is then discarded, retaining the cut foam wing panels. The exploded view is typical of the finished wing panels after they have been removed from the foam-cutting device.

The foam material 80 may be selected from the polystyrene or polyurethan family. A rigidized, low density, expanded bead-type of cellular polystyrene foam is preferred for its light weight and relative rigidity. The electrically heated wires 38 are suitably adjusted by a rheostat to cut the type of foam material selected.

Figure 4:
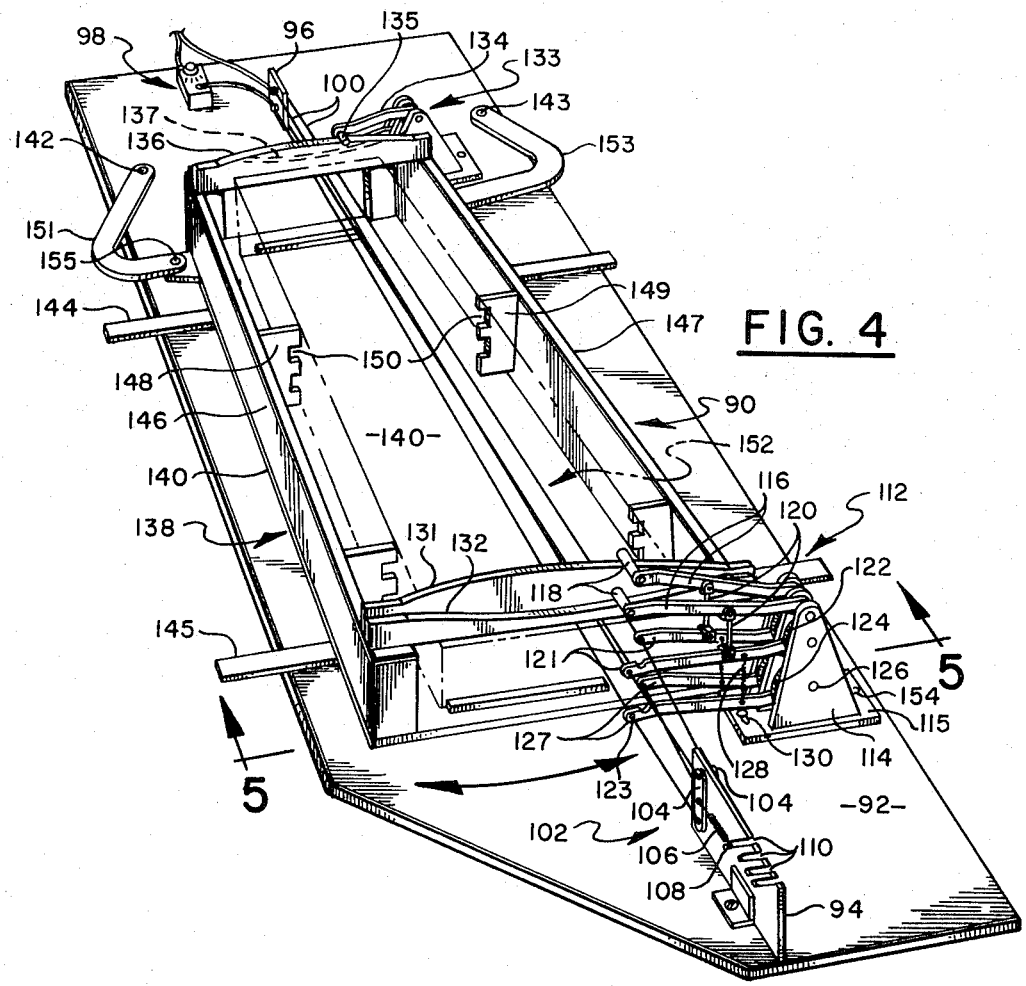
FIG. 4 is a partially broken away perspective view of still another embodiment of the instant invention, showing the various components of the apparatus.

Turning now to FIG. 4, a preferred embodiment is disclosed whereby the foam cutter generally designated as 90 is comprised of a base 92 having mounted thereon a whiffle-tree anchor tower 94 and a terminal block 96. The nichrome wires 100 are stretched between the terminal block 96 and the whiffle-tree apparatus generally designated as 102. The whiffle-tree tower 94 supports on one side a whiffle-tree bar 104 which is attached to a pair of nichrome wires 100. On the opposite side of base 94 is a similar whiffle-tree bar 104 that supports the other two nichrome wires, there being, for example, four nichrome wires in all. Springs 106 centrally connect the whiffle-tree bars 104 and are anchored to a spring-retaining pin 108 which is engaged with one of many adjustable clevis slots 110. The whiffle-tree devices 104 attached to springs 106, being on opposite sides of the whiffle-tree anchor 94, assure that an equal and constant tension is applied to all four wires being stretched between the terminal block 96 and the whiffle-tree apparatus 102. A variable voltage control 98 is connected between the terminal block 96 and a source of electrical power (not shown).

At one end of base 92 is anchored a template follower device generally designated as 112. The template follower 112 is comprised of a support tower 114 which extends from a support tower base 115 anchored to base 92. The support tower 114 pivotably supports a pair of cam-follower arms 116 through axial pivot pin 126. At the opposite end of the cam-follower arems is a pair of cam-rollers 118. A pair of mechanical links 120 are interconnected between the cam-follower arms 116 and a pair of wire guide arms 121 parallel to and directly below cam-follower arms 116. At the opposite end of the wire guide arms 121 are the wire guide tubes 123. The wire guide arms 121 are connected at their base to a pair of image gears 122. The image gears 122 are connected to a tower 114 through axial pin 126. The image gears 122 mesh with an identical pair of image gears 124 positioned immediately below gears 122 and supported by the support tower 114 through a similar axial pin 126. Extending from the image gears 124 is still another pair of wire guide arms 127 having wire guide tubes 123 at the extreme end of the arms. A pair of anti-backlash springs 128 are suspended between the upper wire guide arms 121 and the lower wire guide arms 127 so that the coacting wire guide arms do not backlash through the image gears when the cutter is in operation.

Cam-follower rollers 118 ride on a pair of root templates 131 and 132. Each template 131 and 132 represents one side of a wing panel. At the opposite end of base 92, adjacent the terminal block 96, is a similar template follower device generally designated as 133 which comprises a pair of arms having at one end thereof cam-roller followers 135. The camroller followers 135 ride over another pair of tip templates 136 and 137. The interconnecting arms and associated image gears of cam-follower 133 function in exactly the same manner as the cam-follower 112 previously described.

Mounted to base 92 is a carriage assembly generally designated as 138. The carriage assembly 138 is comprised of a carriage base 140, the base 140 being pivotably connected to the base platform 92 through pivots 142 and 143. A pivot link 151 is connected between pivot 142 and pivot 155, the pivot 155 being connected to the movable carriage base 140. Similarly, pivot link 153 is connected to the opposite side of the carriage base 140 so that the carriage may swing through a prescribed arc. The carriage base 140 slides on carriage slideways 144 and 145. The carriage base 140 further supports a pair of vertically extending foam-retaining walls 146 and 147. The foam-retaining walls 146 and 147 support the pair of wing root templates 131 and 132 adjacent the template follower 112, while at the opposite end the walls 146, 147 similarly support the set of tip templates 136 and 137.

In operation, the precut foam block 152 (shown in phantom line) is positioned within the carriage frame 140. A series of shims or positioning wedges 148 and 149 are strategically placed between the walls 146 and 147 to firmly hold the precut foam block 152 within the frame of the carriage 138. Obviously the carriage 138 is positioned at an extreme end of its travel so that the nichrome wires 100 are positioned within the recess guide slots 150 in wedges 148 and 149. When the wires are within the recess slots 150, they do not contact the foam block 152 positioned within the carriage frame 138. The nichrome wires are then heated by the variable voltage control 98 to a temperature sufficient to slice through the foam. The carriage assembly 138 is then moved either mechanically or manually at a uniform rate towards the right through an arc so that the cam-followers 118 start to follow the templates 131, 132, 136, and 137 at opposite ends of the carriage assembly 138. It can be seen that the cams 118 and 135 start fairly close together at the trailing or leading edge of the wing panels and as the carriage is moved in an arc towards the right, the cams start to spread apart, thus moving the various interlinked arms in a scissors fashion apart as the cam rollers roll towards the thickest section of the wing panels. As the cam-follower arms 116 move apart, the mechanical links 120 connecting the cam-follower arms 116 with the wire guide arms 121, the two arms 116, 121, being parallel to one another, assure that the wire guide arms 121 exactly follow the movement of the scissoring cam-follower arms 116. Since the upper wire guide arms 121 are connected by the image gears to the lower wire guide arms 127, the movement of the upper wire guide arms 121 is exactly opposite to the movement of the lower wire guide arms 127, thus the wires moving through the foam block are imaging the rib templates 131, 132, 136 and 137 so that the two panels are facing oppositely to each other as the cutting operation proceeds.

A major difference between the embodiments of FIG. 4 and the embodiment of FIG. 2 is the fact that the nichrome wires are not sliding over the rib templates. In the embodiment of FIG. 4, the wires are free from any sliding contact with the rib templates. The cutting is controlled by the cam-follower arms mechanically connected to the wire guide arms. Thus the nichrome wires being stretched between the whiffle-tree apparatus 102 and the terminal block 96 are unrestricted in that they freely move through the foam block 152, guided by the mechanically linked cam-roller guide arms 116 and 134 at adjacent ends of the carriage 138. As the carriage 138 is moved towards the extreme right, the nichrome wires 100 end up between the recess slots 150 and out of the foam material. The cut foam block 152 can then be removed from the carriage assembly 138 by subsequently first removing the wedge 149.

Figure 5:
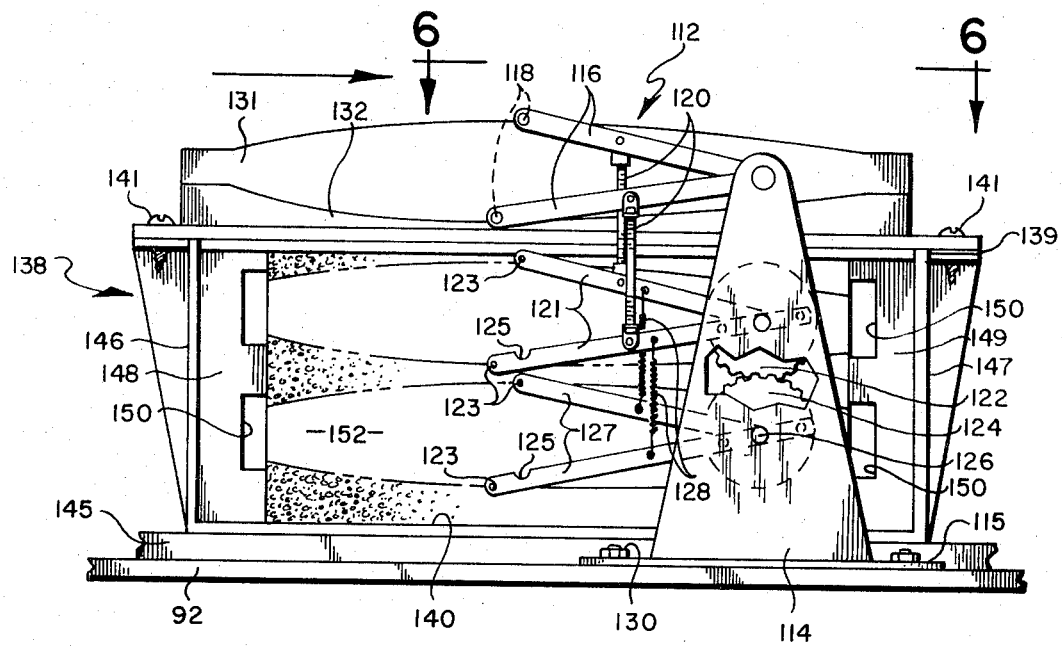
FIG. 5 is a view taken along lines 5—5 of FIG. 4, illustrating the inner action of the cam followers and foam cutting arms guiding the hot wires through the foam block.

Turning now to FIG. 5, the view more clearly shows the operation of the template follower 112. The template follower again is comprised of support tower 114 which houses the pair of image gears 122, 124, as well as the cam-follower arms 116. The cam-follower rollers 118 at the end of the cam-follower arms 116 smoothly follow the templates 131, 132. Since the cam-follower arms 116 are mechanically linked to the wire guide arms 121 through links 120, the wire guide arms 121 have to exactly follow the action of the cam-rollers as they traverse the templates 131, 132. Since the middle pair of wire guide arms 121 are geared by two pair of image gears 122, 124, to another identical pair of wire guide arms 127, the trace of the wires 100 through the foam block 152 has to be exactly the same although the trace of wire guide arms 121 is just opposite to the trace of wire guide arms 127.

This view illustrates that the bottom arm 116 of the pair of scissoring cam-roller follower arms is longer in length than the top arm. When the cam-roller follower arms are approximately parallel to each other at either end of the rib templates, the arms will interfit one with the other without interference, as is clearly seen in FIG. 6. Similarly, the coacting pairs of interlinked, wire-retaining arms 121 and 127 are of varying lengths. The bottom arms of the scissoring wire-retaining arms 121, 127 are longer than the top arms to prevent the four nichrome wires from contacting each other when the wires are at either end of the rib templates. Notches 125 in the longer bottom arms 121, 127 allow the wires retained in the top arms 121, 127 to clear the bottom arms when the arms parallel each other.

The rib templates 131 and 132 are mounted to the top of the vertical walls 146 and 147, through screw fasteners 141. If desired, a shim 139 may be placed on one end of the templates 131, 132 to cause the resultant wing panels cut from the foam block to have either a wash-in or wash-out effect. In other words, by using a shim at, for example, the trailing edge of a set of tip templates (136, 137) and maintaining a level attitude at the root templates (131, 132), a washed out wing panel will result which may be aero-dynamically desirable. Thus it can be seen that the wings may be twisted at will.

Figure 6:
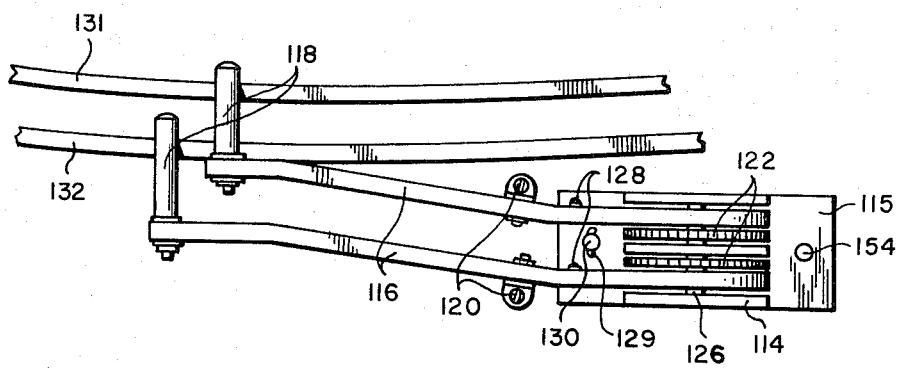
FIG. 6 is a view taken along lines 6—6 of FIG. 5, showing the top view of the second preferred embodiment of the invention, illustrating the coaction of the cam followers as they traverse the templates.

Turning now to the top view of FIG. 6, the rib templates 131, 132 are bent in an arc to conform to the arc of the carriage assembly 138 as it slides over the carriage rails 144 and 145. Since the carriage assembly 138 moves in an arc, it can be seen that the rib templates must be curved to conform to the circumference of the arc. The cam-follower arms 116 are shaped to accommodate for the arc of the rib templates 131 and 132. The cam-follower arms 116 are connected pivotably to the cam-follower tower support member 114 through axial pin 126. This view illustrates the image gears 124 immediately below. The support tower 114, extending from base 115, is movable towards or away from the carriage 138 by pivoting on a fixed pin 154. A bolt 130, positionable in slot 129 in base 115, locks base 115 to base plate 92 after the tower is correctly positioned. By moving the support tower 114 within the slot 129, the cam-follower arms 116 can be positioned so that the rollers 118 uniformly follow or track the arc of the templates 131, 132. The template follower 133, at the opposite end of carriage 138, is substantially identical to the template follower 112, the rib templates 136 and 137 being similarly curved to accommodate for the circumference of the arc as the carriage assembly is moved from one side to the other.

It should be pointed out here that the foam-cutting apparatus of the instant invention may be used to cut other forms distinct from model aircraft wing panels.

It should be further pointed out that the various embodiments disclosed may be completely mechanized, thereby removing any inconsistencies induced by manually operating the devices.

I claim:

1. An apparatus for cutting rigidized foam material comprising:
   a base portion;
   at least one resistively heatable wire suspended between at least a pair of fixed anchor posts mounted to said base portion;
   wire tensioning means at one end of said resistively heatable wire;
   a foam material-retaining means movably mounted to said base portion positioned between said wire anchor posts;
   a block of rigidized foam material shaped to fit within said foam material-retaining means;
   at least a pair of templates at opposite ends of said foam material-retaining means;
   template following means at opposite ends of said foam material-retaining means connected to said heatable wire to direct said wire through said rigidized foam material as the material traverses past said resistively heatable wire; and a source of electrical power to resistance-heat at least one resistively heatable wire suspended between at least a pair of fixed anchor posts to cut said block of rigidized foam material as said movable foam material-retaining means moves said block into said heated wire.

2. The invention as set forth in claim 1 wherein said foam material-retaining means is pivoted at one end to said base portion so that said foam material-retaining means swings through an arc through at least one of said resistively heatable wires suspended between said at least one pair of fixed anchor posts.

3. The invention as set forth in claim 1 wherein said wire tensioning means comprises a spring attached to one end of said at least one resistively heatable wire.

4. The invention as set forth in claim 3 wherein there are at least a pair of resistively heatable wires, said wire tensioning means being a whiffle-tree mechanism comprising a bar having attached at either end said pair of resistively heatable wires, said bar having centrally attached thereto a spring means, said spring means being anchored to one of said fixed anchor posts mounted to said base portion.

5. The invention as set forth in claim 1 wherein at least one resistively heatable wire is nichrome wire having a diameter of between 0.0073 and 0.020.

6. The invention as set forth in claim 1 wherein said rigidized foam is a low density, expanded bead type of cellular polystyrene foam.

7. The invention as set forth in claim 1 wherein said templates at opposite ends of said foam material-retaining means are shaped to an airfoil cross section.

8. The invention as set forth in claim 1 wherein said template following means is comprised of a shoe means having a recess portion therein and a wire retaining slot on an opposite side of said shoe means, said recess in said shoe means being adapted to slide over the peripheral edge of said templates, thus guiding the at least one resistively heatable wire retained in said wire retaining slot over said templates at opposite ends of said foam material-retaining means.

9. The invention as set forth in claim 1 wherein said template following means at opposite ends of said foam material-retaining means is further comprised of a cam-roller following arm having a cam-roller following means at one end thereof, the other end being pivotably anchored to a support tower attached to said base portion, said cam-roller following means being in direct contact with the peripheral edge of said pair of templates at opposite ends of said foam material-retaining means, said cam-roller following arm being interconnected with at least one wire retaining arm substantially parallel to said cam-roller following arm and pivotably connected to said support tower at one end, the other end being adapted to retain said resistively heatable wire, said wire retaining arm exactly following the trace of the cam-roller following arm as the cam-roller following means moves over said peripheral edge of said pair of templates to direct said wire unimpeded through said block of rigidized foam material.

10. The invention as set forth in claim 9, further comprising a second wire retaining arm pivotably anchored to said support tower, said arm being connected through image gears at one end pivotably mounted in said support tower, said image gears meshing with a pair of image gears connected to the base of said first wire retaining arm connected to said cam-roller following arm, thus guiding at least one more resistively heatable wire unimpeded through said rigidized foam block retained in said movable foam block retaining means, thereby cutting a pair of forms from said foam block in a single pass.

11. An apparatus for cutting rigidized foam material to form separate model aircraft wing panels in the same block of material comprising:

a base portion;

at least a pair of resistively heatable wires suspended between a pair of fixed anchor posts mounted to said base portion;

wire tensioning means at one end of said heatable wires;

a foam material-retaining mechanism pivotably mounted to said base portion positioned between said fixed wire anchor posts;

a block of rigidized foam material shaped to fit within said foam material-retaining mechanism;

at least a pair of templates at opposite ends of said pivotable foam material-retaining mechanism;

template following means at each end of said foam material-retaining mechanism, including at least one cam-follower means connected to a cam-following arm pivotably attached to a support tower anchored to said base portion;

a first wire guide means including at least one wire guide arm pivotably attached to said support tower, said wire guide arm being substantially parallel with said cam-following arm through a mechanical link connected between said cam-following arm and said wire guide arm, thereby exactly following the trace of said cam follower means as it traverses the peripheral edge of said templates;

a second wire guide means including at least one additional wire guide arm pivotably attached to said support tower, said first and second wire guide means being connected through their pivots by a pair of image gears, enmeshed one with the other so that as the first wire guide means moves up following said cam-follower means, said second wire guide means moves down an equal distance, thereby directing said resistively heatable wires unimpeded through said block of rigidized foam material as the pivotable foam material-retaining mechanism is moved through an arc into said wires; and a source of electrical power to resistance-heat said wires suspended between said anchor posts to cut said block of rigidized foam material retained within said foam material-retaining mechanism.

* * * * *